United States Patent [19]

Baram

[11] Patent Number: 4,553,564

[45] Date of Patent: Nov. 19, 1985

[54] VALVE

[76] Inventor: David Baram, 19, Meadow Bank Ave., Sheffield, England, S7 1PB

[21] Appl. No.: 595,298

[22] Filed: Mar. 30, 1984

Related U.S. Application Data

[63] Continuation of Ser. No. 318,873, Nov. 6, 1981, abandoned.

[30] Foreign Application Priority Data

| Nov. 7, 1980 [GB] | United Kingdom | 8035791 |
| Dec. 5, 1980 [GB] | United Kingdom | 8039083 |
| Jan. 20, 1981 [GB] | United Kingdom | 8101590 |
| Oct. 27, 1981 [GB] | United Kingdom | 8132348 |

[51] Int. Cl.$^4$ .................. F16K 37/00; F16K 31/163; F16J 9/12

[52] U.S. Cl. .................. 137/554; 137/557; 137/516.29; 251/63.5; 251/214; 277/117; 277/190

[58] Field of Search .......... 251/62, 63.5, 214; 137/554, 557, 559, 516.29; 403/349; 92/207; 277/110, 111, 117–122, 190, 191

[56] References Cited

U.S. PATENT DOCUMENTS

| 178,911 | 6/1868 | Adams | 277/117 |
| 657,600 | 9/1900 | Heston | 92/207 |
| 1,289,434 | 12/1918 | Fulton | 251/271 |
| 1,961,157 | 6/1934 | McCoy | 137/139 |
| 2,279,238 | 4/1942 | Larson | 92/207 |
| 2,492,873 | 12/1949 | Lamb | 251/63.5 |
| 2,615,468 | 10/1952 | Woolley | 251/61.4 |
| 2,687,144 | 8/1954 | Rafferty | 251/62 |
| 2,918,339 | 12/1959 | Hagadone | 277/117 |
| 3,096,096 | 7/1963 | Banks | 277/117 |
| 3,115,068 | 12/1963 | Lofink | 91/414 |
| 3,183,922 | 5/1965 | Lamb et al. | 137/155 |
| 3,424,427 | 1/1969 | Ruscher | 251/44 |
| 3,529,622 | 9/1970 | Weise et al. | 137/516.29 |
| 3,529,804 | 9/1970 | Perrin | 251/63.5 |
| 3,563,508 | 2/1971 | De Lorenzo | 251/63.5 |
| 3,735,772 | 5/1973 | Hunter et al. | 251/44 |
| 3,787,060 | 4/1974 | Astill et al. | 251/214 |
| 3,858,910 | 1/1975 | Oetiker | 403/349 |
| 3,913,885 | 10/1975 | Greenwood et al. | 92/207 |
| 4,103,864 | 8/1978 | Hagendorn | 251/63.6 |
| 4,143,586 | 3/1979 | Zitting | 92/207 |
| 4,214,727 | 7/1980 | Baram | 251/63.5 |
| 4,280,708 | 7/1981 | Arai | 277/119 |

FOREIGN PATENT DOCUMENTS

| 114375 | 10/1900 | Fed. Rep. of Germany . |
| 1113857 | 9/1961 | Fed. Rep. of Germany . |
| 1905022 | 11/1969 | Fed. Rep. of Germany . |
| 2100141 | 2/1972 | Fed. Rep. of Germany ..... 251/63.6 |
| 2126977 | 11/1972 | Fed. Rep. of Germany . |
| 2846296 | 4/1979 | Fed. Rep. of Germany . |
| 1095150 | 12/1954 | France . |
| 1299114 | 6/1962 | France . |
| 1304434 | 8/1962 | France . |
| 1343747 | 10/1963 | France ................................. 251/61 |
| 1004134 | 9/1965 | United Kingdom . |
| 1061099 | 3/1967 | United Kingdom . |
| 1070997 | 6/1967 | United Kingdom . |
| 1124813 | 11/1968 | United Kingdom . |
| 1230887 | 5/1971 | United Kingdom . |
| 1258693 | 12/1971 | United Kingdom . |
| 1490662 | 11/1977 | United Kingdom . |

Primary Examiner—Alan Cohan
Assistant Examiner—John A. Rivell
Attorney, Agent, or Firm—Sandler & Greenblum

[57] ABSTRACT

A valve comprising a housing having an open-ended portion of circular internal cross-section, an inlet port and an outlet port, the ports being interconnected by a flow space. An obturator is located within the flow space and attached to a movable head such that fluid flow through the valve may be regulated by the obturator by movement of the head. The head retains a seal which bears upon the inner surface of the portion of the housing so as to resist fluid flow past the head. Preferred features include the provision of biasing means which maintain the seal in a state of compression and a seal which has the form of a hollow open-ended cylinder in which the hollow is frusto conical in shape. A bellows connecting the head to the housing and/or a seal provided on the head and bearing against an external cover are especially beneficial since these provide secondary seals against leakage from the flow space. Other advantageous features include the provision of a leak detector, a valve which can be readily dismantled and a specialized form of obturator.

45 Claims, 9 Drawing Figures

VALVE

This is a continuation of application Ser. No. 318,873 filed Nov. 6, 1981 now abandoned.

BACKGROUND OF THE INVENTION

1. Field of the Invention

The present invention relates to valves and in particular to valves of the type in which fluid flow through the valve may be regulated.

2. Description of the Prior Art

Many different types of valve are known and often the details of the valve are specific to the application for which the valve is intended. However, known valves often present relatively poor characteristics especially with respect to leakage from the valve, efficiency and reliability of operation, particularly if a wide range of applications is envisaged.

SUMMARY OF THE INVENTION

The present invention seeks to provide an improved valve which is capable of a wide range of applications and which has special advantages for certain applications.

According to the present invention there is provided a valve comprising a housing having a open-ended portion of circular internal cross-section, an inlet port and an outlet port, a flow chamber interconnecting the ports, an obturator located within the flow chamber, a movable head to which the obturator is attached such that fluid flow through the valve may be regulated by the obturator by movement of the head, a seal which is retained on the head and which bears upon the inner surface of the said portion so as to resist fluid flow past the head, and biasing means which apply a uniform bias to the circumference of the seal so as to enhance the said resistance.

The valve of the present invention has a wide range of applications and is applicable to both reciprocating and rotary type valves. The arrangement of the seal results in the valve being suitable for low temperature applications.

A particularly advantageous valve is provided when the seal is formed of a non-elastomer material.

Preferably the head includes resilient biasing means which maintain the seal in a state of compression.

The provision of such baising means is of particular benefit when the seal is manufactured from a material which has a flow characteristic, for example PTFE.

Advantageously the seal has the form of a hollow open-ended cylinder in which the hollow is frusto conical in shape.

This shape of seal enables a very high resistance to leakage from the flow space to be provided.

It is preferred that the valve comprises an external cover which surrounds the head and the said portion of the housing, the head being provided with an additional seal which bears against a portion of the cover having a circular internal cross-section. Additionally or alternatively, it is preferred that the valve comprises a bellows which surrounds the said portion of the housing, one end of the bellows being connected to the housing and the other end being connected to the head, these features provide secondary seals against leakage from the flow space and therefore represent further improvements in the specifications of the valve.

Numerous other advantageous features are disclosed and these include the provision of a leak detector, a valve which can be readily dismantled and a specialised form of obturator.

BRIEF DESCRIPTION OF THE DRAWINGS

Embodiments of the invention will now be described by way of example only and with reference to the accompanying drawings, in which.

DESCRIPTION OF THE PREFERRED EMBODIMENTS

In the drawings, the same reference numerals are used to denote directly corresponding components.

Figures 1, 2:
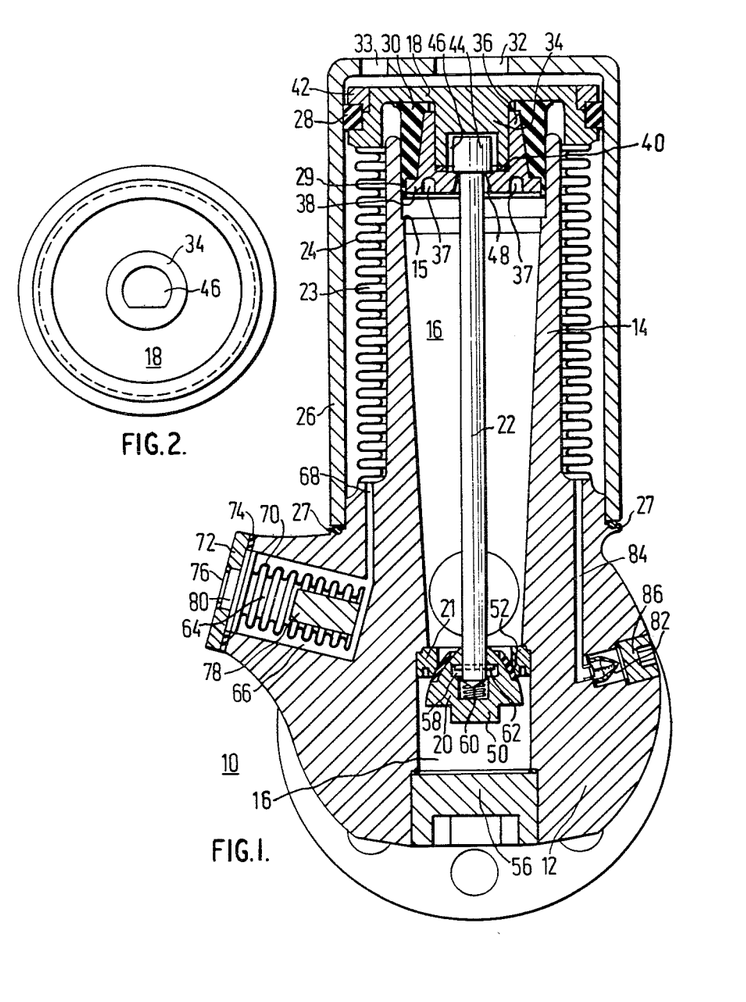
FIG. 1 illustrates a vertical section through a first embodiment of the valve taken in a direction orthogonal to the direction of fluid flow through the valve.
FIG. 2 is a view of the underside of the head shown in FIG. 1.

A first embodiment of the valve is shown in FIG. 1. The valve 10 comprises a housing 12 having a hollow and open-ended cylindrical portion 14, an inlet port and an outlet port. The ports are interconnected by a flow space 16 which extends within the cylindrical portion 14 of the housing 12. A head in the form of a hollow piston 18 is located co-axially with and movable along the axis of the cylindrical portion 14. An obturator, designated generally by the reference numeral 20, is provided within the flow space 16 and is attached to the piston 18 by a stem 22. The obturator 20 cooperates with a seat 21 in order to regulate the fluid flow through the valve 10.

The piston 18 has a boss 34 projecting co-axially from its inner surface. Threadedly engaged with the boss 34 is a cap 36. The top of the cap 36 is provided with a circumferential flange or lip 38 which engages a seal 30. The seal 30 is generally in the form of a hollow and open-ended cylinder in which the hollow is frusto conical in shape. The seal 30 is located substantially co-axially with the boss 34 and is compressed against the inner surface of the piston 18 by the lip 38 of the cap 36. That part of the cap 36 which engages the boss 34 of the piston 18 has an external configuration which corresponds with the inclined inner surface of the seal 30. Therefore as the cap 36 is tightened on the boss 34, with the aid of a suitable tool located in the recesses 37, not only is the seal 30 compressed against the piston 18 but a radially outward force is also applied to the seal 30. The piston 18 is slidable along the axis of the cylindrical portion 14 with the seal 30 bearing against the inner surface of the cylindrical portion 14. The longitudinal compression and radially outward force acting on the seal 30 result in a very efficient sealing between the housing 12 and the piston 18. A spring (not shown) may be inserted between the seal 30 and the inner surface of the piston 18 in order to provide an enhanced compressive force on the seal 30 and this becomes particularly advantageous the longer the seal 30 has been in position, especially if the seal 30 is manufactured from a material exhibiting a "flow" characteristic. A particularly advantageous valve is provided when the seal 30 is formed of a non-elastomer material.

The seal 30 is provided with a projection 29 which extends between the lip 38 of the cap 36 and the cylindrical portion 14 of the housing 12. The projection 29 of the seal 30 projects beyond the lip 38 such that when the valve 10 is fully opened, the projection 29 is compressed against a ledge 15 provided on the inner surface of the cylindrical portion 14.

As shown in FIG. 1, the external sides of the cap 36 are inclined from the lip 38 towards the axis of the boss 33 in order to facilitate compression and retention of the seal 30. However, it is possible for the seal 30 to be replaced by a number of "V" ring seals stacked one on top of one another and in such an arrangement the sides of the cap 36 need not be inclined. If "V" ring seals are employed, spring means (not shown) may advantageously be provided between the lip 38 and the seals. A suitably shaped seal receiving cup may be provided on the inner surface on the piston 18.

The seal 30, or the above-described alternative seals, may be made of PTFE in order to provide a long service life and minimal maintanance. Seals made from such material benefit from being maintained in a state of tension and are thus particularly suitable for the present application.

Use of the cap 36 to retain the seal 30 facilitates the use of seals of different characteristics to be employed in accordance with the specific fluid, temperature, pressure or other parameters of operation of the valve. Also, since the seal 30 bears on the inner rather than the outer surface of the cylindrical portion 14 of the housing 12, the valve 10 is particularly suitable for low temperature or cryogenic applications.

A bellows 24 is provided co-axially with and surrounding the cylindrical portion 14 of the housing 12. One end of the bellows 24 is secured to the periphery of the piston 18 and the other end of the bellows 24 is secured to the housing 12. An external cover 26 is provided which fits over and encloses both the piston 18 and the bellows 24 and which is secured to the housing 12. The cover 26 may either be welded to the housing 12 or may be threadedly engaged therewith in which case a seal 27 is provided in order to ensure a fluid tight engagement. The connection of the bellows 24 to the piston 18 and to the housing 12 are fluid-tight. The piston 18 is axially slidable within the cover 26 and a seal 28 provided on the circumference of the piston 18 ensures a fluid tight seal with the cover 26.

Seal 30 forms the primary seal for preventing leakage of fluid from the flow space 16. The bellows 24 provides a secondary seal such that should any leakage occur across the seal 30, direct leakage from the valve 10 does not ensue. A valve having a secondary seal is particularly desirable in systems where leakage of fluid from the flow space could present a safety hazzard and also in systems where the fluid is expensive.

In the valve illustrated in FIG. 1, the provision of seal 28 forms a third barrier which inhibits leakage from the fluid space to the exterior of the valve 10.

Apertures 32 and 33 are provided through the cover 26 above the piston 18. A pressurised fluid is introduced through the aperture 32 in order to control the axial position of the piston 18 with respect to the cylindrical portion 14 and thus control the position of the obturator 20 with respect to the seat 21. Mechanical means (not shown) extend through aperture 33 and permit manual control of the piston 18.

The seal 28 is provided in a circumferential groove in the side of the piston 18 and the seal 28 provides a fluid tight sliding engagement between the piston 18 and the cover 26. The seal 28 is secured in the circumferential groove by a compression ring 42, and to aid retention of the seal 28, the groove and/or compression ring 42 are provided with peripheral axial projections as shown in FIG. 1.

Figures 3, 4:
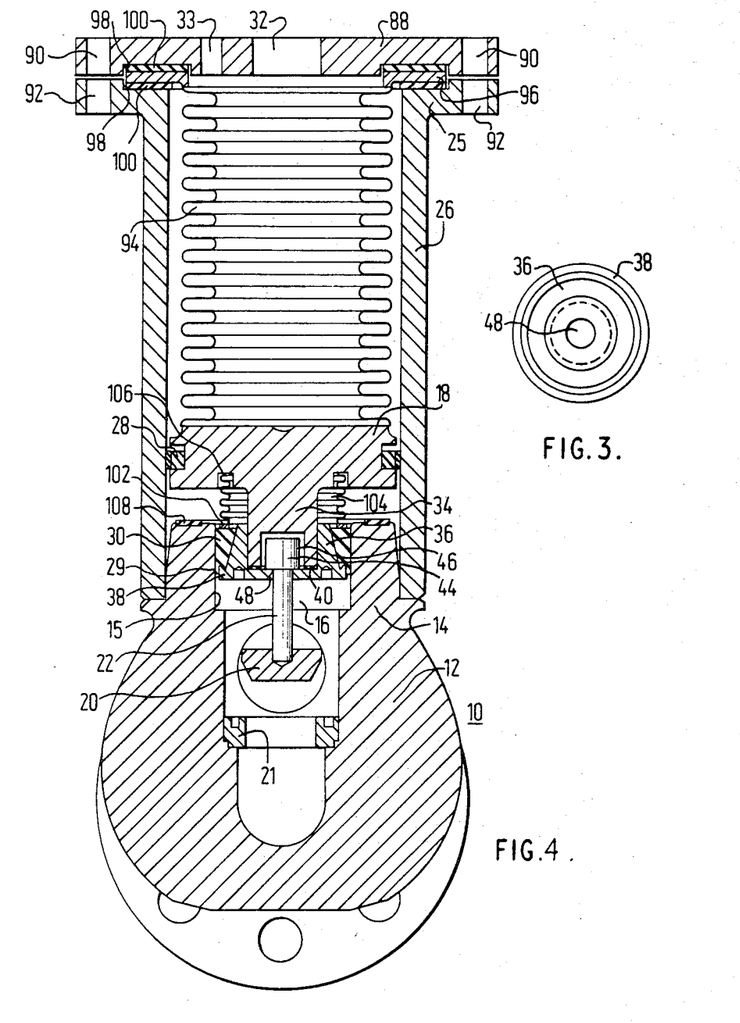
FIG. 3 is a plan view of the cap shown in FIG. 1.
FIG. 4 illustrates a vertical section through a second embodiment of the valve taken in a direction orthogonal to the direction of fluid flow through the valve.

A view of the underside of the piston 18 is given in FIG. 2 and a plan view of the cap 36, that is looking into the cap 36, is shown in FIG. 3.

As already mentioned, the obturator 20 is attached to the piston 18 by a stem 22. The stem 22 terminates in an enlarged head 44, of semicircular transverse cross-section, at the end attached to the piston 18. The boss 34 is provided with a central recess 46 having a transverse cross-section of segmented shape and in which the head 44 is positioned. The cap 36 has a correspondingly positioned aperture 48 which is dimensioned such that the stem 22 may pass through but also such that the head 44 is retained within the recess 46 when the cap 36 is secured to the boss 34. This method of mounting the stem 22 on the piston 18 permits lateral and limited rotational displacement of the obturator 20 with respect to the longitudinal axis of the cylindrical portion 14 of the housing 12. The sides of the aperture 48 in the cap 36 are inclined in order to enhance the permitted displacements. The head 44 of the stem 22 may be described as a floating head and the permissible displacement of the obturator 20 means that the obturator 20 is effectively self aligning with respect to the seat 21. A seal 40 is positioned between the top of the boss 34 and the top of the cap 36. This seal 40 mitigates the problem of ingress of fluid into the threads between the cap 36 and the boss 34 which could cause the threads to seize and leak past the thread.

It should be noted that the seat 21 is self cleaning in the sense that its orientation combined with the fluid flow tends to prevent debris collecting on the face cooperating with the obturator 20.

Rotation of the stem 22 is limited by the relative size and previously described cross-sectional shapes of the head 44 and the recess 46. Rotational limitation is necessary to permit removal and replacement of the obturator 20 either via one of the ports or upon removal of a plug 56 from the base of the housing 12. The obturator 20 comprises a body 50 and a seal 52. Seal 52 surrounds the upper portion of the body 50 and is mounted on a stepped portion of the body 50. The seal 52 need not be secured to the body 50 and this facilitates the fitting of a type of seal 52 and corresponding seat 21 which best meet the operational requirements. The obturator 20 is accessible via the removable plug 56 provided in the base of the housing 12. The obturator body 50 is secured to the stem 22 in bayonet fit fashion. To this end, the body 50 is provided with a suitably shaped recess 58 within which is located a spring 60. The stem 22 is provided with a cross pin 62. The base of the body 50 may be suitably shaped to allow the bayonet fixing to be operated from the base of the housing 12 when the plug 56 is removed or from one of the ports. The bayonet fixing provides ease of assembly and disassembly and mitigates problems such as overtightening and seizing which are associated with the known methods of obturator retention by means of screw threads.

The valve 10 is provided with a leak detector 64 which detects leakage from the flow space 16 past the seal 30. The leak detector 64 includes a chamber 66 provided in the housing 12 and connected to the space 23 between the bellows 24 and the cylindrical portion 14 of the housing 12 by means of a bore 68. A bellows 70 is positioned within the chamber 66 in a manner to collapse towards the exterior of the housing 12 where the chamber 66 is sealed by a plate 72 secured to the housing 12 and having an intervening seal 74.

The inside of the bellows 70 is isolated from fluid connection with the bore 68 and terminates adjacent an aperture 76 in the plate 72. An indicator 78 is fixed to the inside of the bellows 70. The space 23, bore 68 and chamber 66 are partially evacuated and the bellows 70 extends, and hence indicator 78 recedes, from the aperture 76. If the pressure within the chamber 66 increases, for example due to leakage from the flow space 16, the bellows 70 tends to collapse and consequently the indicator 78 is urged towards the aperture 76, thus providing an indication that leakage has occurred. Such indication may be purely visual in which case the aperture 76 may be blocked by a transparent member 80 to prevent unwanted ingress of foreign material into the chamber 66, or the indicator 78 may project through the aperture 76. Alternatively, the indicator may be attached to or replaced by suitable magnetic switches, proximity switches, photo-optic or pressure sensitive means or other such apparatus. If the indication is to be purely visual, the indicator 78 may be simply a colouring or other marking on the inside of the bellows 70.

Although the leak detector 64 has been described with the space 23 having a reduced pressure compared with the expected pressure within the flow space 16, it will be apparent that the leak detector 64, with or without modification, is also applicable to the case where the pressure within the space 23 is higher than the pressure expected within the flow space 16. A higher pressure within the space 23 than within the flow space 16 may be desirable when it is more acceptable for the fluid flowing through the valve to be contaminated than for that fluid to escape from the valve 10.

In applications where the fluid flowing through the valve is particularly noxious, a neutralising fluid may be introduced into space 23.

If a pressure difference is provided between the space 23 and the space between the bellows 24 and cover 26, then the leak detector 64 will also respond to leakage past the bellows 24 as well as past the seal 30. Leakage past the bellows 24 may be caused by fatigue or defective welding of the bellows 24 to the other components.

Preferably, the stiffness of the bellows 70 and the ambient pressure difference acting on the bellows 70 should be selected so that the extension of the bellows 70 is not significantly altered by pressure changes caused by the reciprocating movement of the head 18, while still providing leakage indication as described. However, if such selection is not available for a certain valve application, then changes in the extension of the bellows 70 during reciprocation of the head 18 can be calibrated and deviation from the calibration will then indicate that leakage has occured.

For some valve configurations it may be desirable to modify the leak detector 64 such that the space 23 is connected to the fluid space within the bellows 70 rather than the fluid space within the remainder of the chamber 66.

A unidirectional valve 82 is located in the housing 12 and is connected to the space between the bellows 24 and the cylindrical portion of the housing 12 by a bore 84. A removable plug 86 is provided in the housing 12 so as to cover the valve 82 when the valve 82 is not in use. The space between the bellows 24 and the cylindrical portion 14 of the housing 12 may be partially evacuated by the use of a suitable pump attached to the valve 82. A pressure difference can thus be provided across the bellows 24 and across the seal 30. The bellows 70 within the chamber 66 is caused to expand by reducing the pressure in the space 23 via the valve 82. If leakage occurs past the seal 30 of the bellows 24 the leak detector 64 will provide a warning in the manner described above. Since the valve 10 is not automatically closed upon the occurrence of such leakage, the valve 82 may be used in the following manner to determine the urgency of rectifying the leak. A fluid sample may be withdrawn through the valve 82 and by analysis of the fluid it may be determined whether the seal 30 or bellows 24 is at fault. Thus a decision can be made whether to delay maintanence to a more convenient time or if attention is urgently required.

FIG. 4 illustrates a second embodiment of the valve 10. In the valve illustrated in FIG. 4 the obturator 20 is located on the same side of the seat 21 as the head 18 which is in contrast with the arrangement shown in FIG. 1. The obturator 20 and its connection to the stem 22 may be of any suitable form. The bellows 24 which is joined to the piston 18 and the housing 12 in the first embodiment is omitted in the second embodiment of the valve 10. The seal 28 therefore forms the secondary seal of the valve. The external cover 26 of the valve is formed in two parts. The first part of the cover 26 is cylindrical and is attached to the housing 12 and surrounds the head 18 in the same manner as does the valve shown in FIG. 1. However, at the upper end of the external cover 26 a radially outwardly extending flange 25 is provided and the top part of the cover 26 is constituted by a flat plate 88 which is supported by and attached to the flange 25. The plate 88 has bores 90 located around the periphery of the plate 88 and extending through the thickness thereof. Corresponding bores 92 pass through the flange 25. The plate 88 is preferably secured to the flange 25 by means of bolts (not shown) which extend through the bores 90 and engage with threads cut on the surfaces of the bores 92.

A bellows 94 has one end welded to the top of the piston 18 and is provided with a retaining ring 96 welded to the other end of the bellows 94. The plate 88 and flange 25 are provided with annular recesses which correspond in dimension and position to the retaining ring 96 which, like the bellows 94, is positioned concentrically with the external cover 26 and cylindrical portion 14 of the housing 12. A ring shaped seal 100 is located in each of the recesses 98 and the retaining ring 96 is held between the two seals 100. The seals 100 seal the joint between the flange 25 and plate 88. The apertures 32 and 33 pass through the plate 38 such that the operating means which act upon the head 18 are surrounded by the bellows 94. The bellows 94 and seals 100 therefore represent the third seal preventing leakage from the flow space 16 to the exterior of the valve 10.

The valve 10 illustrated in FIG. 4 has been designed so as to be capable of being readily dismantled. Once the bolts which secure the plate 88 to the flange 25 have been removed, the plate 88 is lifted from the flange 25 subsequent to which all of the moving components of the valve can be lifted clear of the housing 12 and cover 26 in a very straight forward manner. Since the securing ring 96 is welded to the bellows 94 which are in turn welded to the head 18, these components together with the seal 30, stem 22 and obturator 20 are all removed from the valve as a single unit. Subsequent to the removal of those components as a single unit it is possible to remove and replace other components such as the seat 21.

The unit of components removed from the valve can be replaced by a new unit of components or any necessary maintanance or modifications can be effected to the unit of components before they are reinserted into the valve. Thus, for example, it is a simple operation to change the seal 30 for a seal manufactured of a different material which is more suited to the fluid which is to pass through the valve 10 during the following production process.

The valve 10 illustrated in FIG. 4 is particularly advantageous for applications in which the valve is required to be sterilized or otherwise cleaned in between different production processes. This type of application is a frequent requirement in the food processing and pharmaceutical industries. Valve 10, which can be readily dismantled is also advantageous in other fields of technology. If the fluid passing through the valve 10 is particularly dangerous, it is sometimes necessary to locate the valve 10 at the base of a shaft which is provided, for example, within a concrete structure. In such circumstances the ready removal of the moving components of the valve 10 by withdrawal from the top of the valve is particularly advantageous.

Several of these advantages of the valve 10 can still be retained if the cover 26 and plate 88 illustrated in FIG. 4 are replaced by the cover 26 illustrated in FIG. 1. In such a valve the bellows 94 would be omitted or releasably secured to the cover 26. The cover 26 would be removed by disengaging its threaded connection with the housing 12 and the unit of moving components would then be withdrawn from the valve together with the cover 26, if the bellows 94 is provided, or would be separately lifted out, if the bellows 94 is omitted.

The detailed arrangement of the head 18 and associated components has several modifications compared with the first embodiment of the valve 10. The head 18 does not straddle the cylindrical portion 14 of the housing 12 in this second embodiment. The cap 36 does not compress the seal 30 directly against the underside of the head 18 but instead compresses the seal 30 against a compression ring 102. The compression ring 102 has a force applied to it by a bellows 104. The bellows 104 is located co-axially with the boss 34 of the head 18 and has its other end located in an annular recess 106 provided on the underside of the head 18 around the base of the boss 34. The provision of the bellows 104 ensures that the seal 30 is constantly urged against the inner surface of the cylindrical portion 16 of the housing 12.

When the valve 10 is fully closed the extension 29 of the seal 30 may seal against the ledge 15 provided in the housing 12 and, additionally or alternatively, an annular seal 108 may be positioned on the top surface of the cylindrical portion 14 such that the underside of the head 18 is seated on the seal 108 when the valve 10 is fully closed. Thus the gasket 108 provides an additional seal when the valve 10 is fully closed. Metal to metal contact between the head 18 and housing 12 is prevented by the gasket 108 and this is of particular advantage when the valve 10 is employed in a low temperature system.

Although not illustrated in FIG. 4, the leak detector 64 and valve 82 can be utilized with this second embodiment of the valve 10. The bores 68 and 84 are connected to the space defined between the head 18 and the top of the cylindrical portion 14. Consequently, the leak detector is capable of indicating leakage past the seal 30 or seal 28.

Figure 5:
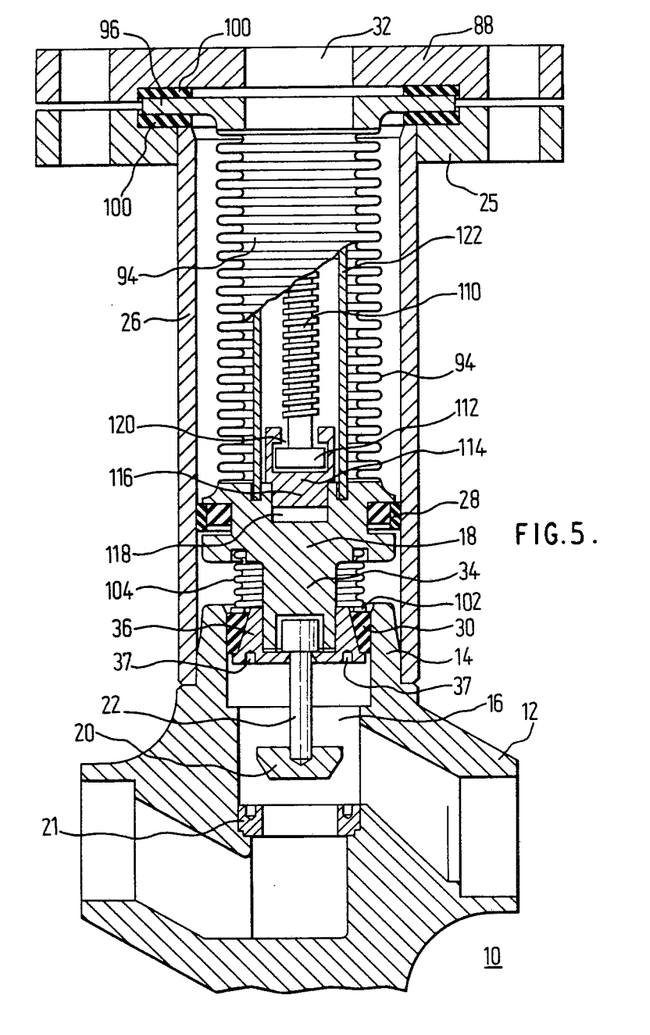
FIG. 5 illustrates a vertical section through a further embodiment of the valve.

FIG. 5 shows a further embodiment of the valve 10 and illustrates a mechanical operating means which acts upon the head 18 so as to control displacement of the obturator 20 relative to the seat 21 and thereby regulate fluid flow through the valve 10. The embodiment of FIG. 5 is similar to the embodiment shown in FIG. 4.

Axial displacement of the head 18 is effected by means of a stem 110 which extends through the external cover 26. The stem 110 is positioned co-axially with the cylindrical portion 14 of the housing 12. The stem 110 is threaded and engages a complementary threaded insert (not shown) which is located in the aperture 32 in the plate 88. Rotation of the stem 110 by any suitable means will result in axial displacement of the stem 110. As an alternative to threaded engagement between the stem 110 and an insert provided in aperture 32, the stem 110 may be axially displaced by the application of a direct axial force provided by a servo motor.

The stem 110 is terminated at its lower end by an enlarged head 112 and the head 112 is engaged and retained by an attachment member 114. The attachment member 114 is secured to the head 18 by means of a threaded projection 116 of the attachment member 114. The threaded projection 116 engages a threaded aperture 118 which is provided in the centre of the upper surface of the head 18. The attachment member 114 has a central recess 120 which is stepped so as to provide an inner and laterally enlarged recess open to the upper surface of the member 114 by an outer and laterally less extensive recess. The outer recess is smaller than the width of the enlarged head 112 of the stem 110 whereas the inner recess is slightly larger than the head 112. At least one lateral side of the recesses is open such that the head 112 can be slid into central recess 120 with the stem extending through the smaller recess.

Subsequent to the engagement of the head 112 of the stem 110 with the attachment member 114, a sleeve 122 is inserted into the bellows 94. The sleeve 122 is seated in an annular recess provided in the upper surface of the head 18 which is concentric with and encircles the aperture 118. The sleeve 122 surrounds the attachment member 114 and hence the walls of the recess 120 are restrained from lateral displacement and consequently the head 112 is prevented from disengaging with the attachment member 114. The length of the sleeve 122 is such that the sleeve 122 abuts the ring 96 or plate 88 so as to prevent the seal 30 from disengaging with the valve housing 12 when the valve is fully open. The sleeve 122 has a diameter sufficiently close to the internal diameter of the bellows 94 so as to provide support for the bellows 94 particularly when the bellows are subjected to high pressures or to rapid changes in pressure.

Figure 6:
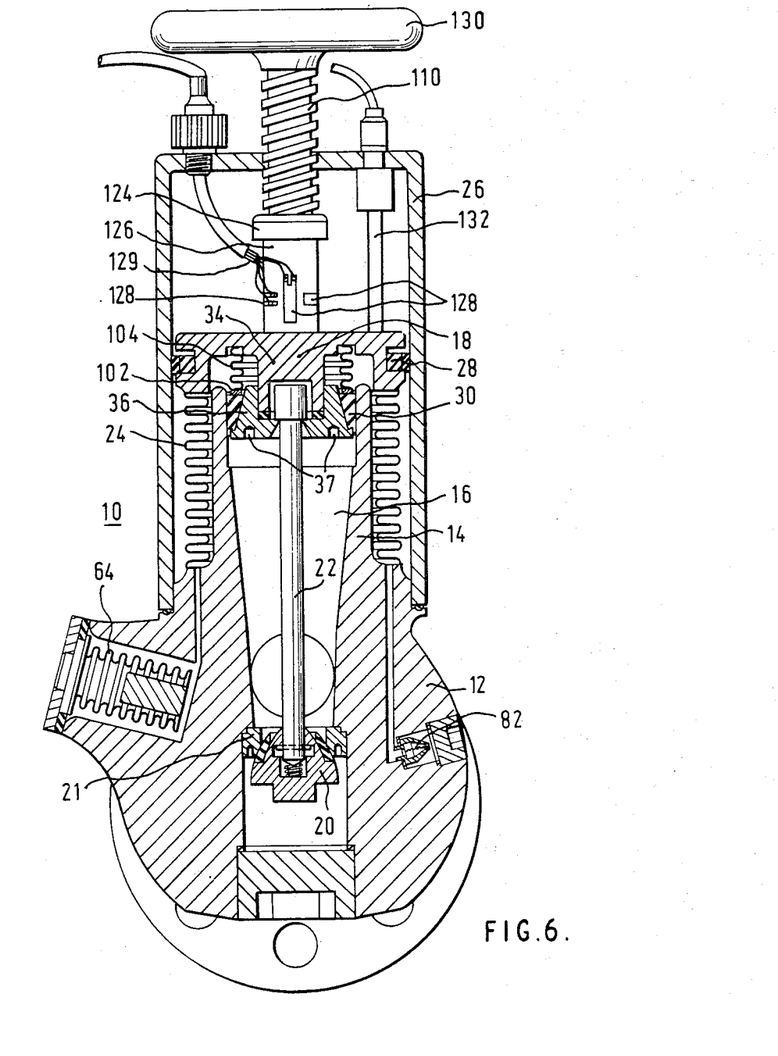
FIG. 6 shows a vertical section through a further embodiment of the valve, the section lying in a plane which includes the direction of fluid flow through the valve.

A further embodiment of the valve 10 is shown in FIG. 6. This embodiment is similar to the valve 10 illustrated in FIG. 1 but incorporates some of the modifications to the moving components which are included in the embodiment shown in FIG. 4. Hence the present embodiment is provided with bellows 24 which surrounds the cylindrical portion 14 of the housing 12 and also with bellows 104 which acts upon a compression ring 102 in order to compress the seal 30. The main modification of this embodiment is that the stem 110 used for controlling the axial position of the head 18 is connected to the head 18 via a coupling member 124 and a load cell 126. The stem 110 is terminated at its lower end by the coupling member 124. The coupling member 124 is in direct contact with one end of the load cell 126 and the other end of the load cell 126 is either directly connected to the head 18 as shown or may be connected to a further coupling member which is secured to the head 18. The stem 110 is threaded and engages a threaded insert (not shown) located in the external cover 26 and may be rotated by means of the hand wheel 130.

Fluid flowing through the valve 10 passes through the flow space 16 which is closed by the head 18 and seal 30. Consequently, the fluid pressure can be monitored by the load cell 126 since the fluid pressure is transferred via the head 18 to the load cell 126. The effect of fluid pressure acting on the obturator 20 should be taken into consideration when undertaking such monitoring.

Strain gauge 128 are located on the exterior of the load cell 126 and are electrically connected by leads 129 to apparatus (not shown), external to the valve 10, in order to provide information concerning the fluid pressure within the flow space 16. Information thus derived may be used to determine the correct opening of the valve and, by the use of suitable circuitry and a mechanical drive attached to the stem 110, operation of the valve 10 may be fully automated utilizing a feedback principle. The load cell 126 and strain gauges 128 may be replaced by other suitable pressure responsive means, for example, a semi-conductor material whose resistance is pressure dependent and means of relaying such change in resistance to the external monitoring apparatus.

In order to permit further modes of valve operation a head position indicator 132 is provided. The indicator 132 is located between the head 18 and the external cover 26 adjacent the load cell 126. The indicator 132 provides information concerning the axial location of the head 18 with respect to the cylindrical portion 14 of the housing 12. The axial location of the head 18 controls the relative displacement of the obturator 20 with respect to the seat 21. The combination of the load cell 126 and the indicator 132 enables the fluid pressure within the flow space 16 to be monitored at any specified valve opening. The indicator 132 may be a simple mechanical device such as a twin concentric cable in which the outer cable is secured to the external cover 26 while the inner cable extends into the valve and contacts the head 18. An alternative form for the indicator 132 is a plunger which contacts the head 18 and which serves to operate a hydraulic system.

Other alternative forms of the head position indicator 132 are based upon optical monitoring. One such form is the use of a light source which is reflected off the upper surface of the head 18, which may be specially prepared so as to enhance its reflective properties. An array of detectors is positioned such that light reflected from the head 18 is scanned across the array, thus monitoring the position of the head 18. A further form of optical implementation of the head position indicator 132 has a rod one end of which is connected to the head 18 and the other end of which extends between either a single or a series of light sources and corresponding detectors. Illumination or otherwise of individual detectors thus indicate the position of the head 18.

The load cell 126 having strain gauges 128 or other suitable pressure responsive means may be employed in any of the embodiments of the present invention in which the head 18 is controlled by mechanical means acting thereon. The head position indicator 132 can be employed, whether in combination with the pressure responsive means or otherwise, in any of the described embodiments of the present invention.

In the embodiments of the invention in which the seal 30 is compressed by a bellows 104 which acts on the head 18 and a compression ring 102, a modification may be made to the cap 36 in order to increase the pressure urging the seal 30 against the cylindrical portion 14 of the valve housing 12. This modification constitutes providing a circumferential recess (not shown) in the inclined surface of the cap 36 against which the seal 30 abuts. The apertures 37, provided in the cap 36 to accommodate a tool for screwing the cap 36 to the boss 34 of the head 18, are extended so as to connect with the circumferential recess. Thus, when the valve 10 is in operation, pressurised fluid contained in the flow space 16 enters the extended apertures 37 and the circumferential recess and therefore urges the seal 30 against the inner surface of the cylindrical portion 14. This method of applying pressure to the seal 30 is particularly advantageous when the seal 30 is manufactured of PTFE due to the properties of that material. It should be noted that the greater the pressure of the fluid within the flow space 16, the greater is the pressure sealing the seal 30 against the valve housing. If any fluid should leak between the inclined surface of the cap 36 and the seal 30, such fluid is contained by the bellows 104 which forms a fluid tight seal with the head 18 and via ring 102 with the seal 30. Consequently, no leakage has effectively occured past the seal 30.

Figure 9A:
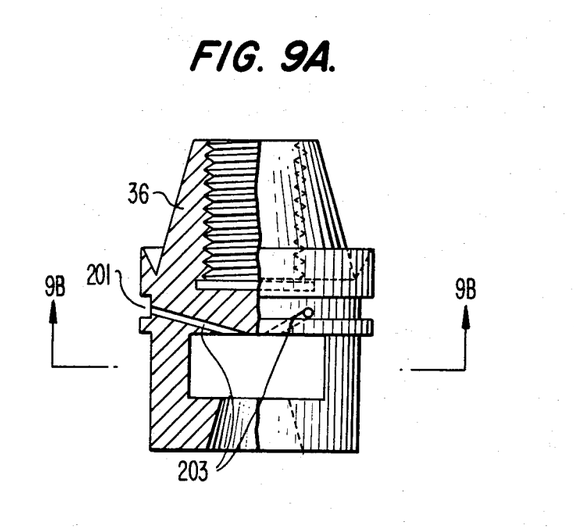
FIG. 9 shows, to an enlarged scale, another embodiment of the cap used in FIGS. 1 and 4-6.
Figure 9B:
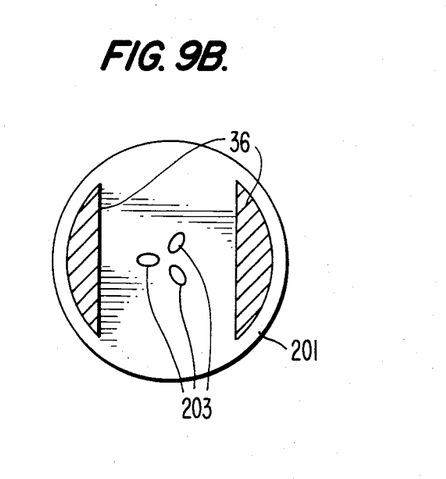

FIG. 9 illustrates bores 203 extending through cap 36 and interconnecting circumferential recess 201 with the flow chamber. This results in the pressure within the flow chamber being applied to a projection 29 of seal 30 to urge projection 29 of seal 30 into contact with the inner surface of housing 12, as illustrated in FIGS. 1 and 4–6. Circumferential recess 201 is located in a surface of cap 36 against which projection 29 of seal 30 abuts. Thus, when valve 10 is in operation, pressurized fluid contained in flow space 16 enters bores 203 and circumferential recess 201 and therefore urges projection 29 of seal 30 against the inner surface of cylindrical position 14.

Figures 7, 8:
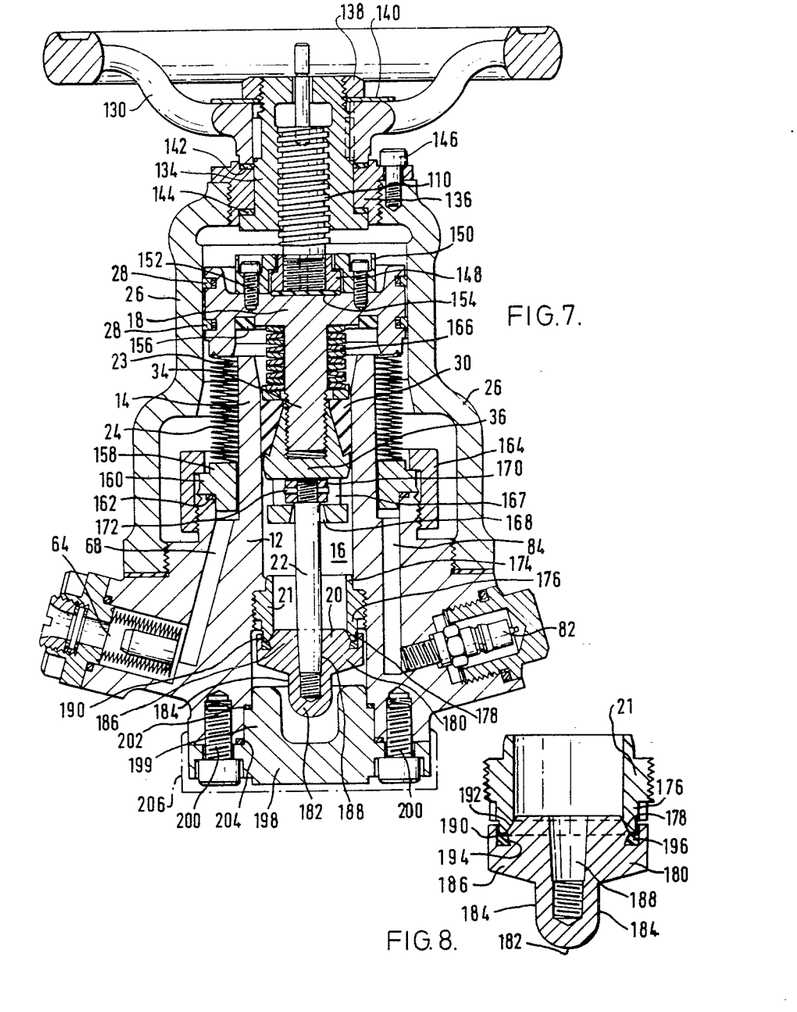
FIG. 7 illustrates a vertical section through a further embodiment of the valve.
FIG. 8 shows, to an enlarged scale, the seat and obturator of the embodiment shown in FIG. 7.

FIG. 7 illustrates a further embodiment of the valve 10. The embodiment of FIG. 7 is similar to the embodiments of FIGS. 1 and 6 but has been modified in order to improve the overall robustness of the valve. The threaded stem 110 engages a threaded recess in a collar 134. The collar 134 is retained in the external cover 26 by means of an insert 136. A hand wheel 130 is keyed to the collar 134 and is axially retained in position by a locknut 138 and identification disc 140. Respective bearings 142 and 144 are provided between the hand wheel 130 and the insert 136 and between the insert 136 and the collar 134. As the hand wheel 130 is rotated, the collar 134 also rotates and consequently the stem 110 is axially displaced. The insert 134 engages the external cover 26 by means of a screw thread and accidental rotation is prevented by bolts 146 which pass through the insert 136 and engage apertures in the external cover 26 as shown. A stem guide (not shown) is provided in collar 134 or cover 26 and prevents stem 110 from rotating by engaging a longitudinal slot in the stem 110.

A head 148 is threadedly attached to the lower end of the stem 110. The head 148 is retained by a ring 150 to the head 18. The head 148 is stepped and the ring 150 is provided with a radially inwardly extending flange which cooperates with the stepped portion of the head 148. The ring 150 is secured to the upper surface of the head 18 by means of bolts 152 which engage threaded recesses in the head 18. A small clearance is provided between the flange of the ring 150 and the stepped portion of the head 148 and the head 148 is seated on a thermal insulator 154 which is located in the centre of the upper surface of the head 18. The small clearance and the thermal insulator 154 can greatly reduce thermal conductivity between the head 18 and stem 110 directly, and via ring 150. This enables the handwheel 130 to be maintained closer to the external ambient temperature than to the temperature of the fluid within the flow space 16.

The head 18 is provided with two circumferential seals 28 each located in a respective recess in the circumference of the head 18. The head 18 is in the form of a hollow piston and the piston straddles the cylindrical portion of the housing 12 as the valve is opened. An annular gasket 156 is seated in an annular recess on the underside of the head 18. When the valve 10 is fully opened the gasket 156 abuts the top of the cylindrical portion 14 and thereby forms an additional seal. Metal-to-metal contact between the head 18 and housing 12 is thereby prevented. One end of a bellows 24 is welded around the circumference of the lower extreme of the head 18. The bellows 24 is co-axial with and surrounds the cylindrical portion 14 of the housing 12 and the outer end of the bellows 24 is welded to a retaining ring 158 which has a radially outward extending flange 160. The internal diameter of the ring 158 is larger than the external diameter of the cylindrical portion 14 of the housing 12 so as to enable the space 23 between the bellows 24 and cylindrical portion 14 to communicate with the bores 68 and 84 which lead to the leak detector 64 and valve 82 respectively. A portion of the lower surface of the flange 160 of the ring 158 contacts an annular gasket 162 which is provided in a recess in the housing 12. The gasket 162 is positioned adjacent the main body of the ring 158. As an alternative to gasket 162, the free end of the lower surface of the flange 160 can be sealed with the housing 12 by means of a fine weld. The fine weld between the ring 158 and housing 12 is for sealing purposes only and the ring 158 is mechanically secured to the housing 12 by a collar 164. If it is desired to dismantle the valve 10 the fine weld between the ring 158 and the housing 12 is ground off. The collar 164 is threadedly engaged with the housing 12 and the upper extreme of the collar 164 is provided with a radially inwardly extending flange which abuts the upper surface of the flange 160 on the ring 158 and thereby mechanically secures the ring 158 to the housing 12.

The head 18 is provided with a boss 34 which projects along the axis of the cylindrical portion 14 from the underside of the head 18. The seal 30 is retained on the head 18 by means of the cap 36 and the seal 30 is compressed by a disc spring 166 which acts on the compression ring 102. The spring 166 corresponds to the bellows 104 which is employed in the embodiments shown in FIGS. 4, 5 and 6. The arrangement of the seal 30 on the head 18 directly corresponds with the previously described embodiments.

The cap 36 secured to the boss 34 is of a modified form in the embodiment shown in FIG. 7. No aperture passes completely through the cap 36 and this eliminates the possibility of leakage between the threaded engagement of the cap 36 with the boss 34 and therefore removes the necessity of the seal 40 provided in the previous embodiments. The cap 36 includes a structure 167 having a generally U-shaped vertical cross-section which extends from the cap towards the obturator 20. An aperture 168 is provided centrally through the base of the U-shaped extension 167 of the cap 36 and the sides of the structure defining the aperture are inclined to the central axis of the valve and diverge towards the obturator 20. The aperture 168 therefore corresponds to the aperture 48 in the preceding embodiments. The upper end of the stem 22 passes through the aperture 168 and is threadedly engaged with a locknut 170 which is positioned between and prevented from rotating by the uprights of the U-shaped extension 167 of the cap 36. Once the stem 22 has been secured in the locknut 170 a retaining pin 172 is inserted into the locknut 170 and stem 22 so as to prevent the components from unscrewing.

The U-shaped structure 167 of the cap 36 enables the attachment of the stem 22 to the head 18 to be more robust than that of the previous embodiments for a standard sized valve. The side walls of the structure 167 can be thicker than the wall of the recess 46 of the boss 34 and can also be thicker than the wall of the recess 46 plus the adjoining wall of the cap 36. The thickness of the stem 22 may be increased and the end of the stem 22 is of reduced diameter rather than being of enlarged diameter. This can facilitate manufacture of the stem 22.

The obturator 20 and seat 21 illustrated in FIG. 7 are of a specialised form. The seat 21 is in the form of an insert which is threadedly secured to the valve housing 12. The seat 21 is generally tubular in shape with the thread for engagement with the housing 12 being provided on the external surface of the seat 21. Towards the upper extreme of the seat 21, the external surface is stepped so as to provide a portion 174 having a reduced external diameter. This stepped portion 174 of the seat 21 mates with a complimentarily-shaped formation on the housing 12. The lower end of the seat 21 is also stepped so as to provide a portion having a reduced external diameter, i.e., portion 176. The portion 176 presents a downwardly extending annular projection and it is with this projection that the obturator 20 cooperates in order to regulate fluid flow through the valve 10. The internal diameter of the seat 21 is constant except at its lower extreme where it forms the free end of the projection 176. At the free end of the projection 176 the internal diameter of the seat 21 increases at a uniform rate. The inclined surface 178 which is produced by the increase in internal diameter of the seat 21 does not meet the external surface of the seat 21 and the lower surface of the seat 21 is therefore in the form of an annulus with its plane perpendicular to the external surface of the seat 21. The seat 21 is located in the housing 12 co-axially with the cylindrical portion 14.

The obturator 20 comprises a body 180 which is secured to the lower end of the stem 22. The body 180 of the obturator 20 has a domed central portion 182 which encloses the end of the stem 22. The end of the stem 22 is threaded and engages a threaded recess which projects into the domed portion 182. The sides 184 of the domed portion 182 are parallel to the axis of the stem 22 and provide a hexagonal external configuration which can be engaged by a spanner or the like so as to secure the obturator body 180 with the end of the stem 22 by providing relative rotation between these components. The stem 22 is prevented from rotating by virtue of the retaining pin 172 and locknut 170 which is rotationally constrained by the walls of the U-shaped extension 167 of the cap 36. Above the side walls 184 the obturator body 180 extends radially outwardly so as to form a cylindrical portion 186. The cylindrical portion 186 has an external diameter approximately equal to the full external diameter of the seat 21.

The stem 22 passes through an axial recess 188 in the cylindrical portion 186 of the obturator body 180 so that the end of the stem 22 can engage with the threaded recess inside the domed portion 182 of the obturator body 180. The axial recess 188 has a circular cross-section which decreases towards the domed portion 182 of the obturator body 180. The lower portion of the stem 22 has a decreasing diameter towards its threaded end which provides a configuration complementary to that of the recess 188 in the cylindrical portion 186 of the obturator body 180. Consequently, as the obturator body 180 is tightened onto the stem 22 the stem 22 acts as a wedge in the cylindrical portion 186 of the obturator body 180 and a very tight seal results between the stem 22 and obturator body 180. This tight seal inhibits the ingress of fluid and therefore reduces the possibility of the threaded engagement of the obturator 20 and stem 22 becoming seized.

An annular recess 190 is provided in the upper surface of the cylindrical portion 186 of the obturator body 180. The depth of the recess extends parallel with the axis of the valve. The recess 190 in the obturator 20 cooperates with the projection 176 of the seat 21 in order to regulate fluid flow through the valve. The details of the recess 190 and projection 176 can be seen more clearly in FIG. 8 which illustrates the seat 21 and obturator 20 in an enlarged scale.

The outer wall of the recess 190 is perpendicular but the inner surface of the recess is formed by two inclined surfaces 192 and 194. The surfaces 192 and 194 are both inclined to the axis of the valve 10 but in opposite directions and at different angles. The inner of the two surfaces, 194, diverges away from the obturator 20 and the surfaces 192 and 194 therefore form an undercut shoulder. The surface 192 is inclined at the same angle as and mates with the inclined surface 178 which terminates the internal surface of the seat 21. When the valve 10 is fully closed the surface 192 of the obturator body 180 is in contact with the surface 178 of the seat 21. A seal 196 is seated in the recess 190 in the obturator body 180 and in particular is retained by the undercut shoulder formed by surfaces 192 and 194. The flat annular surface of the lower end of the seat 21 contacts the seal 196 when the valve 10 is fully closed. As the valve 10 is closed the projection 176 of the seat 21 will first contact the seal 196 which will be compressed until the surfaces 192 and 178 are brought into contact and the valve is then fully closed.

This particular configuration of obturator 20 and seat 21 form a very efficient seal when the valve is fully closed and also provides a number of other advantages.

The obturator body 180 and seat 21 will typically be formed of metal. The present arrangement may therefore be conveniently referred to as a soft-seat seal having a metal-to-metal backup.

The obturator 20 and seat 21 illustrated in FIGS. 7 and 8 can permit a fire proof valve to be constructed. If the seat 21 and obturator 20 are manufactured of metal then, with the valve 10 closed, a fire proof seal will exist due to the contact of the surfaces 192 and 176. Hence if the seal 196 is manufactured of material such as rubber and a fire occurs within the valve 10 and the ring 196 is destroyed, the valve 10 will isolate the fire due to the contact between the surfaces 176 and 192. In addition, the residue of the burnt PTFE ring 196 will tend to be retained within the recess 190 therefore reducing contamination of the system in which the valve 10 is located and in particular of the seal between the surfaces 196 and 192. For applications in which a fire proof valve is required the material from which the seal 196 is formed is selected so as to reduce the possibility of the ring being destroyed. Examples include; a ring formed of graphite granuals or a ring formed of asbestos material.

The seat 21 may be secured to or removed from the housing 12 and the obturator 20 secured to or removed from the stem 22 by removing the base 198 from the valve 10. The base 198 is secured to the housing 12 by bolts 200 which engage with threaded recesses in the housing 12. The base 198 has a hollow boss 199 which projects into the flow space 16 and the external configuration of the boss 199 is stepped so as to correspond with a step provided in the housing 12. A gasket 202 is provided between the housing 12 and the boss 199 at the stepped portions thereof and a further gasket 204 is compressed between the base 198 and the housing 12 at the base of the boss 199. For applications in which maximum leak proof characteristics are required, the removable base 198 and bolts 200 may be enclosed by a cover as shown by the phantom line 206 in FIG. 7. The cover would be welded to the housing 12 and the weld subsequently ground off when it was desired to service the seat and obturator or to dismantle the valve.

The described embodiments of the valve of the present invention are suitable for use in throttle type applications. When these valves are used in such applications, which require a high number of reciprocating movements per unit time, the primary bellows (bellows 24/94) may be advantageously replaced by a spring which has enhanced resilience to such reciprocating movement. Such substitution will of course affect the detail of the described embodiments, such as the leakages to which the leak detector 64 will be responsive.

Although all of the illustrated embodiments show reciprocating type valves, the inventive concept of the present invention as defined in at least claim 1 of the appended claims is considered to be directly applicable to rotary type valves. It is envisaged that the mode of providing a seal which bears against the inner surface of the valve housing is advantageous for butterfly and ball type valves. In such valves the arrangement of the stem 22, obturator 20 and seat 21 will of course be replaced by the corresponding components of the rotary type valves. For rotary type valves the primary bellows (bellows 24/94) should be omitted or should be designed to accept the necessary rotary movement. The rotary movement required by rotary type valves often does not exceed 90° between the fully open and fully closed positions.

If a rotary type valve is constructed having a housing with a cylindrical portion of the shape illustrated in FIG. 7, the seal 30 can be enlarged by providing an extension having an increasing external diameter which seals with the flared end of the inner surface of the cylindrical portion 14. An enhanced seal can thereby be obtained.

What I claim is:

1. A valve comprising a housing having a head end, and open-ended portion of circular internal cross-section, an inlet port and an outlet port, a flow chamber interconnecting the ports, an obturator located within the flow chamber, a moveable head positioned at said head end to which said obturator is attached whereby fluid flow through said valve may be regulated by said obturator by movement of said head, a seal which is retained on said head, said seal bearing upon and sealing said open-ended portion of the housing so as to resist fluid flow past said head, and biasing means which apply a uniform bias to the circumference of said seal, said biasing means being independent of system fluid pressure said sealing being nonenhanced by system fluid pressure.

2. A valve in accordance with claim 1, wherein said seal is formed of a non-elastomeric material.

3. A valve in accordance with claim 1, wherein said seal has the form of a hollow open-ended cylinder in which the hollow is frustoconical in shape.

4. A valve in accordance with claim 3, further comprising an external cover having a circular internal cross-section which surrounds said open-ended portion of the housing and said head, said head being provided with an additional means for sealing which bears against a portion of said external cover.

5. A valve in accordance with claim 4, wherein said head and said open-ended portion of the housing define a space and said housing comprises a chamber having a bellows provided therein, said chamber defining one fluid space and said bellows defining a second fluid space, said first fluid space and said second fluid space being isolated from each other and one said fluid space being in communication with said space defined by said head and said open-ended portion of the housing, whereby leakage from said flow chamber results in a change in pressure difference between the fluid spaces and consequential changes in the extension of said bellows within said chamber forms a leak indicator.

6. A valve in accordance with claim 5, further comprising a valve to permit withdrawal of fluid from said space defined by said head and said open-ended portion of the housing.

7. A valve in accordance with claim 6, wherein said chamber is provided with a cover which closes said chamber at the external surface of said housing and said bellows is provided with a visual indicator which is capable of being viewed through said cover.

8. A valve in accordance with claim 3, further comprising a cap threadably engaging said head, whereby said seal is retained on said head by means of said cap.

9. A valve in accordance with claim 8, wherein said cap has a frustoconical projection which converges towards its free end and which corresponds to and is positioned within said hollow of said seal.

10. A valve in accordance with claim 9, further comprising a boss projecting from said head and engaging said cap.

11. A valve in accordance with claim 3, wherein said movement of said head is a reciprocating movement.

12. A valve in accordance with claim 11, further comprising a bellows having one end and an other end and surrounding said open-ended portion of the housing, said one end of the bellows being connected to said housing and said other end being connected to said head, thereby providing a secondary seal against leakage from said flow chamber.

13. A valve in accordance with claim 11, wherein said obturator and said head are adapted to be withdrawn from said valve as a single unit.

14. A valve in accordance with claim 8, wherein said housing is provided with a ledge at said head end and said seal is provided with a projection which extends beyond said cap and contacts said ledge when said head is at one extreme of said movement.

15. A valve in accordance with claim 8, wherein said head includes a boss having a recess, and further comprising a stem including a shank having an enlarged end, said enlarged end being retained in said recess by said cap, said cap having an aperture through which said shank of said stem passes.

16. A valve in accordance with claim 15, wherein the configuration of said enlarged end and said recess in said boss permit limited rotational movement of said stem.

17. A valve in accordance with claim 16, wherein said cap is provided with an aperture having sides which diverge away from said head whereby the maximum lateral displacement of said obturator is increased.

18. A valve in accordance with claim 11, wherein said housing is provided with a seat, said seat cooperating with said obturator to regulate fluid flow through said valve whereby closure of said valve is achieved by mating said obturator with said seat.

19. A valve in accordance with claim 18 wherein the shape of said obturator and the shape of said seat are complementary, the shape of said obturator being in the form of an annular projection and the shape of said seat being in the form of an annular recess.

20. A valve in accordance with claim 19, wherein said annular recess is provided with an insert, said insert being contacted by said annular projection when said valve is fully closed.

21. A valve in accordance with claim 20, wherein said insert is retained by an undercut shoulder.

22. A valve in accordance with claim 11, wherein said obturator is attached to said head by means of a stem and said obturator is attached to said stem by means of a bayonet fit.

23. A valve in accordance with claim 1 further comprising a seat wherein said seat and said obturator have complimentary shapes, one of which is provided with a second seal, whereby said seat and said obturator cooperate to regulate fluid flow through said valve and closure of said valve is achieved by mating said obturator with said seat.

24. A valve as claimed in claim 1, wherein the head includes resilient biasing means which maintain the seal in a state of compression.

25. A valve as in claim 6, comprising a monitoring device responsive to changes in extension of the bellows within the chamber.

26. A valve as in claim 24, wherein the resilient biasing means is a bellows.

27. A valve as in claim 13, comprising an external cover which surrounds said portion of the housing and the head, and a bellows, one end of which is secured to the head and the other end of which is releasably attached to the cover, whereby means for effecting movement of the head, which enter the valve via the external cover, are isolated by the bellows from leakage from the flow chamber.

28. A valve as in claim 27, wherein the external cover comprises a main body and a closure member which are releasably secured together and wherein the end of the bellows is secured to a retaining member which is clamped between the main body and the closure member.

29. A valve as claimed in claim 12, wherein the ends of the bellows is connected to the housing by being secured to a retaining ring which seals against the housing and by a collar which is secured to the housing and abuts said rings so as to anchor the ring and bellows to the housing.

30. A valve as claimed in claim 11, wherein the head has a lateral extent exceeding that of said portion of the housing and wherein a seal is provided so as to prevent direct contact of the head with the housing at one extreme of the movement of the head.

31. A valve as in claim 8, wherein the obturator is attached to the head by means of a stem and wherein a support member is provided on the cap, the support member being provided with an aperture which opens into a recess in which a retaining member is located, the stem being attached to the head by passing through the aperture in the support member and being retained by the retaining member whereby limited lateral displacement of the obturator is permitted.

32. A valve as in claim 26, wherein the obturator is attached to the head by means of a stem and wherein a support member is provided on the cap, the support member being provided with an aperture which opens into a recess in which a retaining member is located, the stem being attached to the head by passing through the aperture in the support member and being retained by the retaining member whereby limited lateral displacement of the obturator is permitted.

33. A valve as claimed in claim 31, wherein the side of the aperture in the support member diverge away from the head so as to increase the maximum lateral displacement of the obturator.

34. A valve as in claim 11 wherein movement of the head is controlled by a control stem which enters the valve and acts upon the opposite side of the head to the obturator.

35. A valve as in claim 34, comprising a sleeve, one end of which contacts the surface of the head opposite the obturator and the other end of the sleeve is brought into contact with an external cover of the valve so as to provide a limit at one extreme of movement of the head, the control stem extending within the sleeve.

36. A valve as claimed in claim 34, wherein a pressure responsive means is located between the control stem and the head.

37. A valve as claimed in claim 36, wherein the pressure responsive means is in the form of a load cell which includes strain gauges, the strain gauges being connectible to external monitoring equipment so that pressure in the flow chamber may be monitored.

38. A valve as in claim 36, wherein an external cover surrounds said portion of the housing, and further comprising a head position indicator which indicates the position of the head relative to said portion of the housing.

39. A valve as in claim 38, wherein the head position indicator comprises twin concentric cables, one of which is secured to a stationary component of the valve and the other of which is secured to the head.

40. A valve as in claim 38, wherein the head position indicator comprises an hydraulic system operated by a plunger attached to the head.

41. A valve as claimed in claim 38, wherein the head position indicator comprises a source of electromagnetic radiation which is reflected from the head and which scans an array of detectors as the head reciprocates.

42. A valve as in claim 38, wherein the head position indicator comprises an array of detectors illuminated by electromagnetic radiation and means attached to the head which varies the number of detectors illuminated as the head reciprocates.

43. A valve as in claim 11, wherein the obturator and seat are each provided with an additional formation, the additional formations contacting each other when the valve is fully closed.

44. A valve as in claim 11, wherein the obturator is attached to the head by a stem and the obturator is attached to the stem by means of a screw thread provided in a recess in the obturator and wherein the recess in the obturator and the corresponding portions of the stem are provided with complementary inclined surfaces which diverge towards the head such that the inclined surfaces of the stem and obturator recess form a wedge-like seal as the obturator and stem are threadably engaged.

45. A valve comprising a housing having an open-ended portion of circular inner cross-section, an inlet port and an outlet port, a flow chamber interconnecting the inlet and outlet ports, an obturator located within the flow chamber, a movable head to which the obturator is attached whereby fluid flow through the value may be regulated by the obturator by movement of the head, a seal comprising a body portion and a projecting portion, said seal being retained on the head and bearing upon the inner surface of said open-ended portion of said housing thereby resisting fluid flow past the head, biasing means which apply a uniform bias to the circumference of the body portion of said seal, said biasing means being independent of system fluid pressure, whereby the resistance of fluid flow past the head is enhanced, said body portion of said seal having the form of a hollow, open-ended cylinder in which the hollow is frustoconical in shape, said seal being retained on the head by means of a cap which threadably engages the head, said cap having a frustoconical projection which converges toward its free end and which corresponds to and is positioned within the hollow of said seal, said frustoconical projection being provided with a circumferential recess and at least one bore extending through the cap and interconnecting the circumferential recess with the flow chamber whereby pressure within the flow chamber is applied to said projecting portion of the seal thereby urging the projecting portion of the seal into contact with the inner surface of the housing.

* * * * *